United States Patent
Kung et al.

(10) Patent No.: US 9,158,175 B2
(45) Date of Patent: Oct. 13, 2015

(54) OPTICAL COUPLER

(75) Inventors: Silas Kung, Waterville, MN (US); Anand Gopinath, Orono, MN (US); Jaesang Oh, Minneapolis, MN (US)

(73) Assignee: K G Technology Associates, Inc., Waterville, MN (US)

( * ) Notice: Subject to any disclaimer, the term of this patent is extended or adjusted under 35 U.S.C. 154(b) by 321 days.

(21) Appl. No.: 13/575,283

(22) PCT Filed: Jan. 27, 2011

(86) PCT No.: PCT/US2011/022761
§ 371 (c)(1),
(2), (4) Date: Aug. 10, 2012

(87) PCT Pub. No.: WO2011/094435
PCT Pub. Date: Aug. 4, 2011

(65) Prior Publication Data
US 2012/0301071 A1    Nov. 29, 2012

Related U.S. Application Data

(60) Provisional application No. 61/298,872, filed on Jan. 27, 2010.

(51) Int. Cl.
*G02F 1/295* (2006.01)
*G02F 1/225* (2006.01)
*G02F 1/01* (2006.01)

(52) U.S. Cl.
CPC .............. *G02F 1/225* (2013.01); *G02F 1/0118* (2013.01)

(58) Field of Classification Search
None
See application file for complete search history.

(56) References Cited

U.S. PATENT DOCUMENTS

| | | |
|---|---|---|
| 5,091,983 A | 2/1992 | Lukosz |
| 5,249,243 A | 9/1993 | Skeie |
| 5,982,964 A | 11/1999 | Marx et al. |
| 6,091,864 A | 7/2000 | Hofmeister |
| 6,310,995 B1 | 10/2001 | Saini et al. |
| 6,453,086 B1 | 9/2002 | Tarazona |
| 6,501,867 B2 | 12/2002 | Gates, II et al. |
| 6,597,830 B1 | 7/2003 | Nakabayashi et al. |

(Continued)

OTHER PUBLICATIONS

J. P. Donnelly et al., "A comparison of power requirements of traveling-wave LiNbO3 optical couplers and interferometric modulators", IEEE J. Quantum Electron., vol. QE-23, No. 1, Jan. 1987; pp. 30-41.

(Continued)

*Primary Examiner* — Tina Wong
(74) *Attorney, Agent, or Firm* — Vidas, Arrett & Steinkraus (57) ABSTRACT

In some embodiments, an optical coupler comprises a substrate, and first and second optical waveguides positioned on the substrate. The second optical waveguide extends adjacent to and parallel with the first optical waveguide for at least one effective coupling length, the at least one length having a first end and a second end. The coupler further comprises a first phase shift section forming a portion of the first optical waveguide and located at a first predetermined distance from the first end of the length, and a second phase shift section forming a portion of the second optical waveguide and located at a second predetermined distance from the second end of the length, wherein the first predetermined distance is approximately equal to the second predetermined distance, and wherein the second optical waveguide does not have a phase shift section located at the first predetermined distance from the first end of the length.

18 Claims, 7 Drawing Sheets

(56) References Cited

U.S. PATENT DOCUMENTS

| | | | |
|---|---|---|---|
| 6,954,568 B2 * | 10/2005 | Liu | 385/45 |
| 2003/0081873 A1 | 5/2003 | Tan et al. | |
| 2003/0161565 A1 | 8/2003 | Bastian | |
| 2005/0058398 A1 * | 3/2005 | Doerr | 385/39 |
| 2005/0259923 A1 | 11/2005 | Sriram et al. | |
| 2007/0211984 A1 | 9/2007 | Gopinath et al. | |
| 2009/0093982 A1 | 4/2009 | Kissa et al. | |
| 2009/0257706 A1 * | 10/2009 | Rasras | 385/14 |

OTHER PUBLICATIONS

C. Laliew et al, "A Linearized Optical Directional-Coupler Modulator at 1.3 μm", IEEE J. Lightwave Technology, vol. 18, No. 9, Sep. 2000; pp. 1244-1249.

T. Li et al., "An Interative Transfer Matrix Inverse Scattering Technique for the Synthesis of Co-Directional Optical Couplers and Filters", IEEE J. Quantum Electronics, vol. 38, No. 4, Apr. 2002; pp. 375-379.

R. C. Alferness et al, "Broadly tunable InGaAsP/InP buried rib waveguide vertical coupler filter", Appl. Phys. Lett., vol. 60, No. 8, pp. 980-982, Feb. 24, 1992.

R. B. Welstand et al., "Combined Franz-Keldysh and Quantum-Confined Stark Effect Waveguide Modulator for Analog Signal Transmission", Journal of Lightwave Technology, vol. 17, No. 3, Mar. 1999, pp. 497-502.

S. A. Hamilton et al, "Comparison of an In-Line Asymmetric Directional Coupler Modulator with Distributed Optical Loss to Other Linearized Electrooptic Modulators", IEEE Trans. Microwave Theory Tech., vol. 47, No. 7 pp. 1184-1193, Jul. 1999.

K. Winick et al., "Design of corrugated waveguide filters by Fourier-transform techniques", IEEE J. Quantum Electronics, vol. 26, No. 11, pp. 1918-1929, Nov. 1990.

G. H. Song et al., "Design of corrugated waveguide filters by the Gel'fand-Levitan-Marchenko inverse-scattering method", J. Opt. Soc. Am. A, vol. 2, No. 11, pp. 1905-1915, Nov. 1985.

M. Nisa Khan et al., "Directional coupler electrooptic modulator in AlGaAs/GaAs with low voltage length product", Appl. Phy. Lett., vol. 62, pp. 2033-2035, Apr. 26, 1993.

W. B. Bridges et al., "Distortion in Linearized Elctrooptic Modulators", IEEE Trans. Microwave Theory Tech., vol. 43, pp. 2184-2197, Sep. 1995.

R. G. Walker, "High speed III-V semiconductor intensity modulators", IEEE J. Quantum Electronics, vol. 27, pp. 654-667, Mar. 1991.

Eva Feral et al., "Iterative Solution to the Gel'Fand-Levitan-Marchenko Coupled Equations and Application to Synthesis of Fiber Gratings", IEEE J. Quantum Electronics, vol. 32, pp. 2078-2084, Dec. 1996.

C. Laliew et al., "Linearized optical directional-coupler modulators for analog Rf/Microwave transmission systems", IEEE MTT-S International Microwave Symposium, pp. 1829-1832, Boston, MA, Jun. 2000.

C. Laliew et al., "A synthesized electrooptic directional-coupler modulator at 1.3 μm with low switching voltage", CLEO 2002, Long Beach, CA, May 2002, p. 42.

S. K. Han et al., "Narrow-band vertically stacked filters in InGaAlAs/InP at 1.5 μm" Journal of Lightwave Tech., vol. 14, No. 1, pp. 77-83, Jan. 1996.

E. I. Ackerman et al., "RF Fiber-Optic Link Performance," IEEE Microwave Magazine, vol. 2, pp. 50-58, Dec. 2001.

S. W. Lovseth et al., "Synthesis of amplitude response of optical directional coupler modulators", 1997 IEEE-MTT-S International Microwave Symposium digest, vol. III, pp. 1717-1720, Jun. 1997.

R. C. Alferness, "Waveguide Electrooptic Modulators," IEEE Trans. Microwave Theory Tech., vol. MTT-30, pp. 1121-1137, Aug. 1982.

N. Dagli, "Wide-bandwidth lasers and modulators for RF photonics", IEEE Transactions on Microwave Theory & Techniques, vol. 47, No. 7, pp. 1151-1171, Jul. 1999.

K. H. Baek et al., "The wavelength dependence of a synthesized electro-optic co-directional-coupler modulator with Π—phase shifters", 2002 Integrated Photonics Research Technical Digest, pp. IThD3-1-IThD3-3, Jul. 2002.

* cited by examiner

OPTICAL COUPLER

CROSS-REFERENCE TO RELATED APPLICATIONS

This is a national stage application of PCT/US2011/022761, entitled, "Optical Coupler," by Silas Kung, Anand Gopinath, and Jaesang Oh, filed Jan. 27, 2010, which claims the benefit of U.S. Provisional Application No. 61/298,872, entitled, "Optical Coupler," by Silas Kung, Anand Gopinath, and Jaesang Oh, and filed on Jan. 27, 2010, the entire contents of which is incorporated herein by reference.

TECHNICAL FIELD

This disclosure relates generally to optical devices, and more specifically to optical couplers.

BACKGROUND

Optical devices are finding increasingly widespread use in various fields such as communications, data processing, storage, and other technologies. In some cases, optical components are completely supplanting the equivalent electrical components. In other situations, components are manufactured which have both electrical and optical characteristics for use in hybrid technologies.

Optical couplers can be used to allow optical signals to interact with each other or in some way provide an interrelationship between the signals. One type of optical coupler uses two waveguides which run parallel to each other. Each waveguide is configured for coupling to separate optical fibers. As optical signals are passed from the optical fibers to the waveguides, the signals propagate along the waveguides. Due to the close proximity and optical characteristics of the waveguides, interaction between the two signals occurs. For example, one signal can be used to modulate an optical signal in the other fiber, one signal can be used to induce an optical signal in another fiber, etc. However, in many instances, optical couplers have undesirable optical characteristics which cannot be easily controlled.

There remains a need for optical couplers capable of achieving high linearity in the output across a wide frequency range. There remains a need for optical couplers capable of operating at lower voltages.

US 2007/0211984, US 2005/0259923 and US 2004/0240790 are hereby incorporated herein by reference in their entireties.

All US patents and applications and all other published documents mentioned anywhere in this application are incorporated herein by reference in their entirety.

Without limiting the scope of the invention, a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided as well only for the purposes of complying with 37 C.F.R. 1.72. The abstract is not intended to be used for interpreting the scope of the claims.

SUMMARY

In some embodiments, an optical coupler comprises a substrate, a first optical waveguide positioned on the substrate, and a second optical waveguide positioned on the substrate, the second optical waveguide extending adjacent to and parallel with the first optical waveguide for at least one effective coupling length, the at least one length having a first end and a second end. The coupler further comprises a first phase shift section forming a portion of the first optical waveguide, the first phase shift section located at a first predetermined distance from the first end of the length, and a second phase shift section forming a portion of the second optical waveguide, the second phase shift section located at a second predetermined distance from the second end of the length, wherein the first predetermined distance is approximately equal to the second predetermined distance, and wherein the second optical waveguide does not have a phase shift section forming a portion of the second optical waveguide and located at the first predetermined distance from the first end of the length.

In some embodiments, an optical coupler comprises a substrate, a first optical waveguide positioned on the substrate, a second optical waveguide positioned on the substrate, the second optical waveguide extending adjacent to and parallel with the first optical waveguide for at least one coupling length, the at least one length having a first end and a second end, and a phase shift section forming a portion of the first optical waveguide, the phase shift section located midway between the first end of the length and the second end of the length, wherein the second optical waveguide does not have any phase shift sections.

In some embodiments, an optical coupler comprises a first optical waveguide, a second optical waveguide configured to couple with the first optical waveguide for at least one effective coupling length, the at least one length having a first end and a second end, and an even number of phase shift sections, wherein the phase shift sections are located in two or more non-propagation sections of the first optical waveguide and the second optical waveguide.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE DRAWINGS

A detailed description of the invention is hereafter described with specific reference being made to the drawings.

DETAILED DESCRIPTION

While this invention may be embodied in many different forms, there are described in detail herein specific embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

Figure 1:
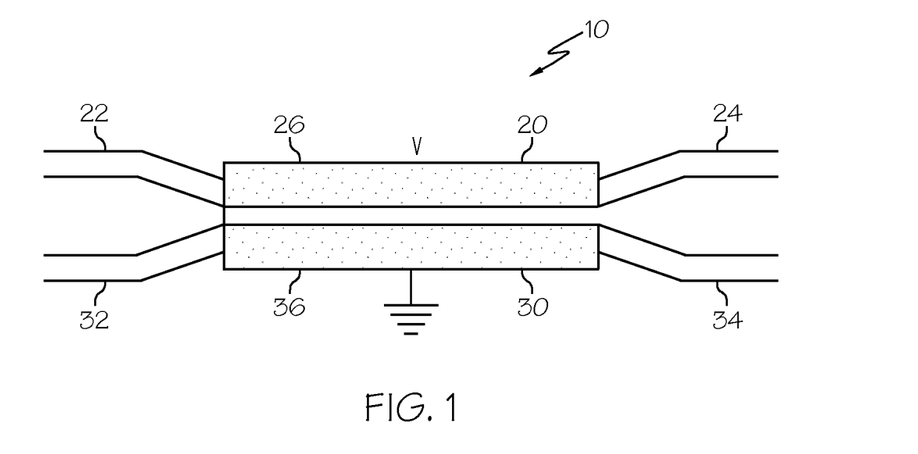
FIG. 1 shows a schematic for an optical coupler.

FIG. 1 shows a simplified schematic diagram of an optical coupler 10 having a first optical waveguide 20 coupled to optical fibers 22, 24 and a second optical waveguide 30 coupled to optical fibers 32, 34. The waveguides 20, 30 are shown as extending in a substantially parallel direction and are aligned on the same plane. Electrodes 26, 36 are positioned on waveguides 20, 30, respectively.

In FIG. 1, if an optical signal is applied to one of the optical fibers, e.g., optical fiber 32, and no direct current (DC) bias voltage is applied between electrodes on the waveguides 20, 30, e.g., electrodes 26, 36, the optical signal will couple to waveguide 20 and propagate out of the coupler 10 via optical fiber 24. If, however, a DC bias voltage V is applied between the first optical waveguide 20 and the second optical waveguide 30, the refractive indices of the waveguides 20, 30 change. Further, by changing the amount of applied DC bias, and thus varying the refractive indices of the waveguides, the output optical signal can be changed from one waveguide to the other waveguide. For example, if an optical signal is applied to one of the optical fibers, e.g., optical fiber 32 and a particular DC bias voltage is applied between electrodes on the waveguides 20, 30, e.g., electrodes 26, 36 of FIG. 2, the output optical signal will exit the coupler 10 on the optical fiber 34 instead of on the optical fiber 24 as occurred when there was no DC bias voltage applied. If desired, the DC bias voltage can be varied (within a range) such that the output optical signal exits the coupler 10 on both optical fibers 24, 34. In such a scenario, the power of the output optical signal is divided between the two waveguides 20, 30 and the fractional power of each depends on the applied DC bias voltage.

Figure 2:
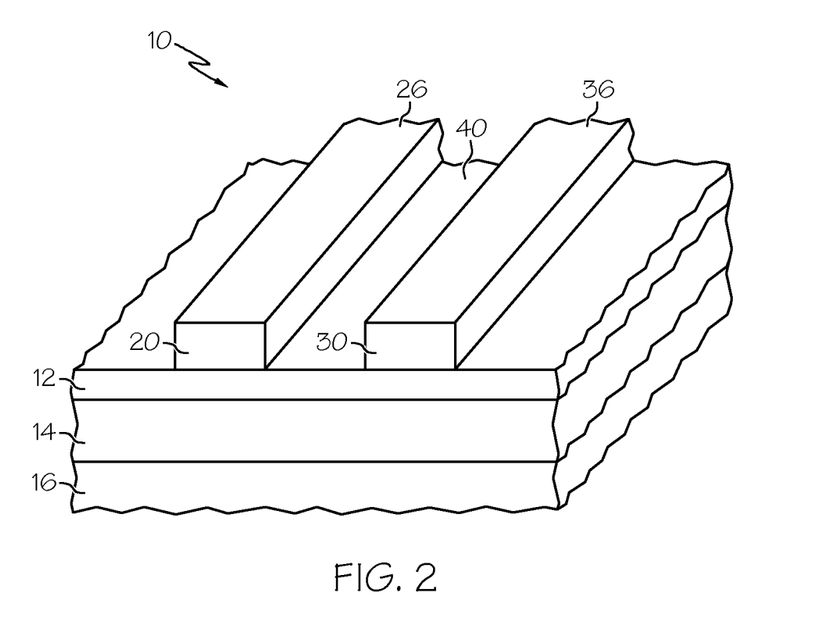
FIG. 2 shows an embodiment of an optical coupler.

FIG. 2 shows a three-dimensional view of an embodiment of a coupler 10 having electrodes 26, 36 that overlay waveguides 20, 30, respectively. In FIG. 2, the waveguides 20, 30 are illustrated as ridge waveguides. In other example implementations, the waveguides can be any suitable waveguides, such as diffused structures or buried guides. In at least one implementation, the guide region has a higher index of refraction than the cladding. The trench 40 between the waveguides 20, 30 is shown as having a constant height. The electrodes 26, 36 are carried on the cladding layer 12 (e.g. on waveguide ridges) that overlies a guide layer 14. The entire structure, including the waveguides 20, 30, is supported by and positioned on a substrate 16.

In some embodiments, an optical coupler 10 has two identical optical waveguides 20, 30 that are placed in close proximity to each other so that the gap between them is a constant. Gap distances typically range from about 1 to about 30 micrometers. In some embodiments, the coupled waveguides 20, 30 are designed to support only two supermodes at the wavelength of operation, one odd and the other even. Analysis of these supermodes indicates that these odd and even modes have different phase velocities. Excitation of an optical signal on one of the guides is in fact the excitation of the superposition of both these modes, so that they add constructively in the excited guide, and add destructively in the non-excited guide. The modes travel at different phase velocities as they move down the guides, and the phase relationship changes so that at some distance downstream, the modes interfere constructively in the non-excited guide but add destructively in the excited guide. This distance is defined as the coupling length $L_C$ of the coupler. In a coupler without any phase shift sections, at one coupling length, all the power of a signal applied to one of the waveguides of the coupler has been transferred to the other, coupled waveguide. In a coupler with phase shift sections, at one effective coupling length ($EL_C$), which is generally greater than a coupling length of a coupler without phase shift sections, all the power of a signal applied to one of the waveguides has been transferred to the other, coupled waveguide. A coupler comprising linear electro-optic effect material allows the index of refraction of the individual guides to be altered, to increase and decrease their indices of refraction by means of electric fields generated using the electrodes 26, 36. A signal applied to the electrodes 26, 36, e.g., a signal having voltage V as in FIG. 1, can effectively change (e.g. decrease) the coupling length and change the power transfer, since the guides are no longer identical, so that the light in the excited guide emerges from it at the end of the coupler 10.

In a coupler that does not include any phase shift sections, an optical signal input on one waveguide, e.g., waveguide 30 of FIG. 1, is coupled to the other waveguide, e.g., waveguide 20 of FIG. 1, as the signal propagates through the coupler 10. Waveguide 30 is referred to as the excited waveguide because the optical signal is applied to waveguide 30, and waveguide 20 is referred to as the non-excited waveguide. In such an example, up until the midpoint of the coupling length of the coupler 10, the excited waveguide 30 has greater than 50% of the power of the optical signal and the non-excited waveguide 20 has less than 50% of the power. At the midpoint of the coupling length of the coupler 10, the power of the optical signal is divided equally between the excited waveguide 30 and the non-excited waveguide 20. After the midpoint of the coupling length of the coupler 10, the non-excited waveguide 20 has greater than 50% of the power of the optical signal and the excited waveguide 20 has less than 50% of the power.

A phase shift is a shift in the phase of a signal that propagates through a waveguide, e.g., waveguides 20, 30, that is, in effect, a delay in the signal. A waveguide can include one or more phase shift sections that insert additional phase shifts in the signal as it propagates through these phase shift sections of the waveguide(s). In accordance with various techniques described in this disclosure, providing a phase shift section in one waveguide 20 while omitting a correspondingly positioned phase shift section in the other waveguide 30 can reduce signal loss in the coupler 10 when compared to couplers that provide identically placed, or corresponding, phase shift sections in both waveguides. In other words, more signal power is transferred through the coupler. Thus, one or more phase shift sections of a first waveguide, e.g., waveguide 20, may be positioned asymmetrically relative to one or more phase shift sections in a second waveguide, e.g., waveguide 30. In at least one other embodiment, a first phase shift section is asymmetrically positioned in a first waveguide, e.g., waveguide 20, when there are no phase shift sections in a second waveguide, e.g., waveguide 30.

Figure 3:
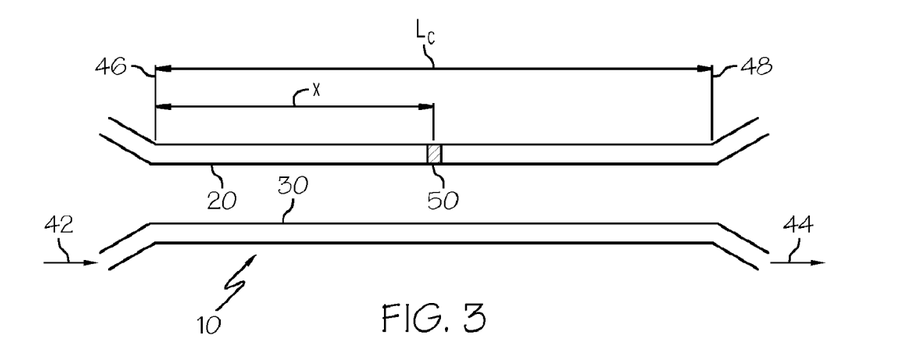
FIGS. 3-5 each show a schematic for an embodiment of an optical coupler.

FIG. 3 shows a schematic for an optical coupler 10 comprising a first optical waveguide 20 and a second optical waveguide 30 that are coupled. The second waveguide 30 extends adjacent to and parallel with the first waveguide 20 for a predetermined length, usually one coupling length $L_C$. Although FIG. 3 shows the waveguides 20, 30 extending for a single coupling length $L_C$, in some embodiments, the waveguides 20, 30 can extend continuously for multiple coupling lengths, such as $2L_C$, $3L_C$, and so on. As shown in FIG. 3, the coupling length $L_C$ spans from a first end 46 to a second end 48.

A phase shift section 50 is provided in the first waveguide 20 a predetermined distance x from the first end 46 of the coupling length $L_C$. The second waveguide 30 does not include a corresponding phase shift section 50 located at the predetermined distance x from the first end 46 of the coupling length $L_C$. Thus, the second waveguide 30 does not include a phase shift section that is aligned with the phase shift 50 of the first waveguide 20. In some examples, the phase of the signal is shifted by 180 degrees at the center wavelength. Providing one or more phase shift sections in a coupler, e.g., coupler 10, at particular locations within one or both waveguides increases the linearity of the response of the coupler. Couplers with linear responses can reduce the amount of overall distortion during transmission due in part to the predictability of the response.

In some embodiments, the optical coupler 10 includes only one phase shift section 50. The phase shift section 50 is provided in one of the waveguides (e.g. the first waveguide 20), and the other waveguide does not include a phase shift section 50.

FIG. 3 shows an input 42 to the second waveguide 30 and an output 44 from the second waveguide 30. In some embodiments, a single phase shift section 50 is provided in the waveguide 20.

In the embodiment of FIG. 3, in accordance with certain techniques described in this disclosure, placing the phase shift section 50 in the first waveguide 20 about midway along the coupling length $L_C$, e.g., approximately centered between the first end 46 and the second end 48, results in output from the excited guide due to the 180 degree phase shift. That is, an optical signal applied at input 42 of waveguide 30 will backward couple to waveguide 30 at the midpoint of the coupler 10 due to the 180 degree phase shift. Thus, the distance x shown in FIG. 3, in some embodiments, is equal to about 50% of the coupling length $L_C$. Generally speaking, when a location of a phase shift section 50 is described in this disclosure, a center of the phase shift section 50 is generally positioned at the described location.

It should be noted that adding phase shift sections increases the length of the coupler and also introduces losses in the coupler. However, the advantage of providing a linear response outweighs the disadvantages of increased length and increased power loss. Using the techniques of this disclosure, however, losses can be reduced by including phase shift sections at a portion of a waveguide in the coupler that has the lesser power of the two waveguides at that instant. For example, in FIG. 3, as described above, the waveguide 20 will have greater than 50% of the power of the optical signal after the midpoint. As such, using the techniques of this disclosure, the phase shift section 50, which causes a 180 degree phase shift, is included in the waveguide 20 at the midpoint where the power between the two waveguides 20, 30 is distributed equally between the waveguides.

Figure 4:
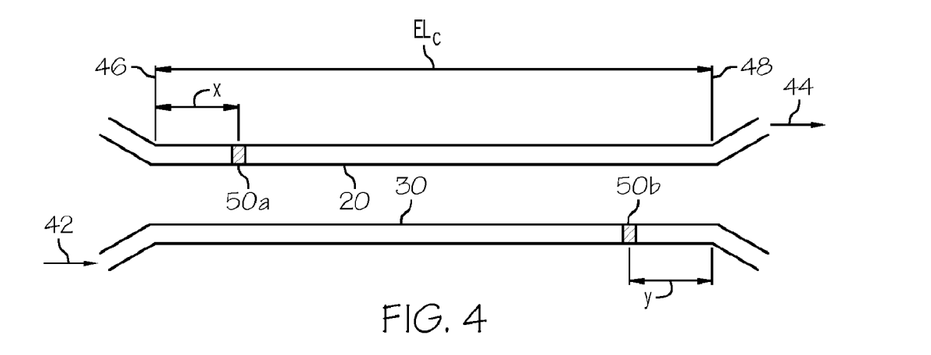

FIG. 4 shows a schematic for another embodiment of an optical coupler 10. The waveguides 20, 30 are similar to the embodiment depicted in FIG. 3; however, the phase shift section 50 arrangement is different from FIG. 3, as described in detail below. In FIG. 4, the effective coupling length $EL_C$ is equal to 1.5 times the coupler length $L_C$ of a coupler without any phase shift sections.

In some embodiments, a first phase shift section 50a is provided in the first waveguide 20 a predetermined distance x from the first end 46 of the effective coupling length $EL_C$, and the second waveguide 30 does not include a phase shift section located at the predetermined distance x from the start 46 of the effective coupling length $EL_F$. Rather, a second phase shift 50b is provided in the second waveguide 30 a predetermined distance y from the second end 48 of the effective coupling length $EL_C$, and the first waveguide 20 does not include a phase shift section located at the predetermined distance y from the second end 48 of the effective coupling length $EL_C$. In some embodiments, the distance x between the first end 46 of the effective coupling length $EL_C$ and the first phase shift section 50a is equal to the distance y between the second phase shift section 50b and the end 48 of the effective coupling length $EL_C$.

In the embodiment of FIG. 4, the first phase shift section 50a is placed in the non-excited guide 20 closer to the input 42 and the second phase shift section 50b is placed in the excited guide 30 closer to the output 44. As seen in FIG. 4, the waveguide 30 does not have a phase shift section located at the distance x, and the waveguide 20 does not have a phase shift section located at the distance y.

A section of one waveguide of a coupler where there is greater power than at a corresponding section of the other waveguide of the coupler is referred to as a propagation section. A section of one waveguide of the coupler where there is lesser power than at a corresponding section of the other waveguide of the coupler is referred to as a non-propagation section. In accordance with various techniques of this disclosure, a coupler such as the coupler depicted in FIG. 4, includes an even number of phase shift sections, namely 50a and 50b, in non-propagation sections. The phase shift section 50a is located in a non-propagation section because if an optical signal is applied at input 42, waveguide 30 has greater than 50% of the power of the signal until the midpoint of the coupler. Similarly, the phase shift section 50b is located in a non-propagation section because waveguide 30 has less than 50% of the power of the signal after the midpoint of the coupler. So, the coupler 10 can include an even number of phase shift sections, e.g., two, wherein the phase shift sections are located in two or more non-propagation sections of the first optical waveguide and the second optical waveguide. In some examples, the even number of phase shift sections are evenly divided between the two or more non-propagation sections. Because the phase shift sections 50a, 50b are placed in the non-propagation sections of the coupler, less power is lost as a result of the phase shift sections, and consequently more power is transferred through the coupler 10. It should be noted that the embodiment depicted in FIG. 4 can provide a more linear response than the example embodiment depicted in FIG. 3.

Figure 5:
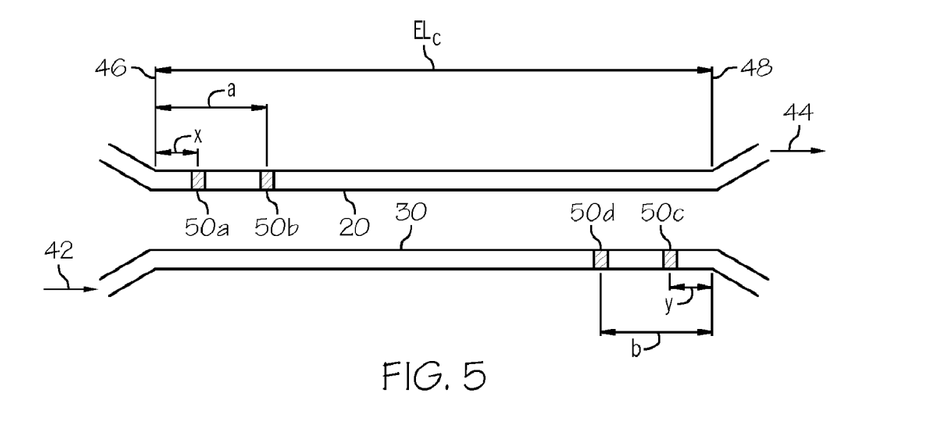

FIG. 5 shows a schematic for another embodiment of an optical coupler 10. The waveguides 20, 30 are similar to the embodiments depicted in FIGS. 3 and 4; however, the phase shift 50 arrangement is different from the previous embodiments. In FIG. 5, the effective coupling length $EL_C$ is equal to 2 times the coupling length $L_C$ of an equivalent coupler without any phase shift sections.

In some embodiments, a first phase shift 50a is provided in the first waveguide 20 a predetermined distance x from the first end 46 of the effective coupling length $EL_C$. A second phase shift section 50b is provided in the first waveguide 20 a predetermined distance a from the first end 46 of the effective coupling length $EL_C$. The second waveguide 30 does not include a phase shift section located at the predetermined distances x or a from the first end 46 of the effective coupling length $EL_C$.

A third phase shift section 50c is provided in the second waveguide 30 a predetermined distance y from the second end 48 of the effective coupling length $EL_C$. A fourth phase shift section 50d is provided in the second waveguide 30 a predetermined distance b from the second end 48 of the effective coupling length $EL_C$. The first waveguide 20 does not include a phase shift section located at the predetermined distances y or b from the second end 48 of the effective coupling length $EL_C$.

In some embodiments, the distance x between the first end 46 of the effective coupling length $EL_C$ and the first phase shift section 50a is equal to the distance y between the third phase shift section 50c and the second end 48 of the effective coupling length $EL_C$. In some embodiments, the distance a between the first end 46 of the effective coupling length $EL_C$ and the second phase shift section 50b is equal to the distance b between the fourth phase shift section 50d and the second end 48 of the effective coupling length $EL_C$.

In some embodiments, the distance x is in a range of about 5% to about 7% of the effective coupling length $EL_F$. In some embodiments, the distance y is in a range of about 5% to about 7% of the effective coupling length $EL_C$. In some embodiments, the distance a is in a range of about 18% to 20% of the effective coupling length $EL_C$. In some embodiments, the distance b is in a range of about 18% to about 20% of the effective coupling length $EL_C$.

In some embodiments, the distance x is equal to about 6% of the effective coupling length $EL_C$ and the distance y is equal to about 6% of the effective coupling length $EL_C$. Further, the distance a is equal to about 19% of the effective coupling length $EL_C$ and the distance b is equal to about 19% of the effective coupling length $EL_C$.

In the embodiment of FIG. 5, the first phase shift section 50a and the second phase shift section 50b are placed in the non-excited guide 20 closer to the input 42, and the third phase shift section 50c and fourth phase shift section 50d are placed in the excited guide 30 closer to the output 44.

Like the example embodiment depicted in FIG. 4, the embodiment depicted in FIG. 5 includes an even number of phase shift sections, namely 50a-50d in non-propagation sections. The phase shift sections 50a and 50b are located in a non-propagation section because if an optical signal is applied at input 42, waveguide 30 has greater than 50% of the power of the signal until the midpoint of the coupler. Similarly, the phase shift sections 50c and 50d are located in a non-propagation section because waveguide 30 has less than 50% of the power of the signal after the midpoint of the coupler. So, the coupler 10 can include an even number of phase shift sections, e.g., four, wherein the phase shift sections are located in two or more non-propagation sections of the first optical waveguide and the second optical waveguide. Because the phase shift sections 50a, 50b are placed in the non-propagation sections of the coupler, less power is lost from the phase shift sections, and consequently more power is transferred through the coupler 10. Although not depicted, an optical coupler can include six or more phase shift sections.

It should be noted that the embodiment depicted in FIG. 5 can provide a more linear response than either the example embodiments depicted in FIG. 3 or 4. In addition, less power is lost using the coupler depicted in FIG. 5 than is lost using other couplers. For example, because the phase shift sections 50a-50d of FIG. 5 are placed in non-propagation sections, less power is lost using the coupler depicted in FIG. 5 than is lost using the coupler depicted in FIG. 21 of U.S. Patent Application Publication No. 2005/0259923. Thus, the coupler depicted in FIG. 5 is more efficient than the coupler depicted in FIG. 21 of U.S. Patent Application Publication No. 2005/0259923.

The phase shift sections 50 can be provided using any suitable structure. In some embodiments, a phase shift section 50 comprises a portion of a waveguide 20, 30 having an effective refractive index different from other portions of the waveguide 20, 30. In some embodiments, a phase shift section 50 comprises a diffused portion and/or an implanted portion of a waveguide 20, 30. In some embodiment, a phase shift section 50 comprises a change in a width of a waveguide ridge.

Figure 6:
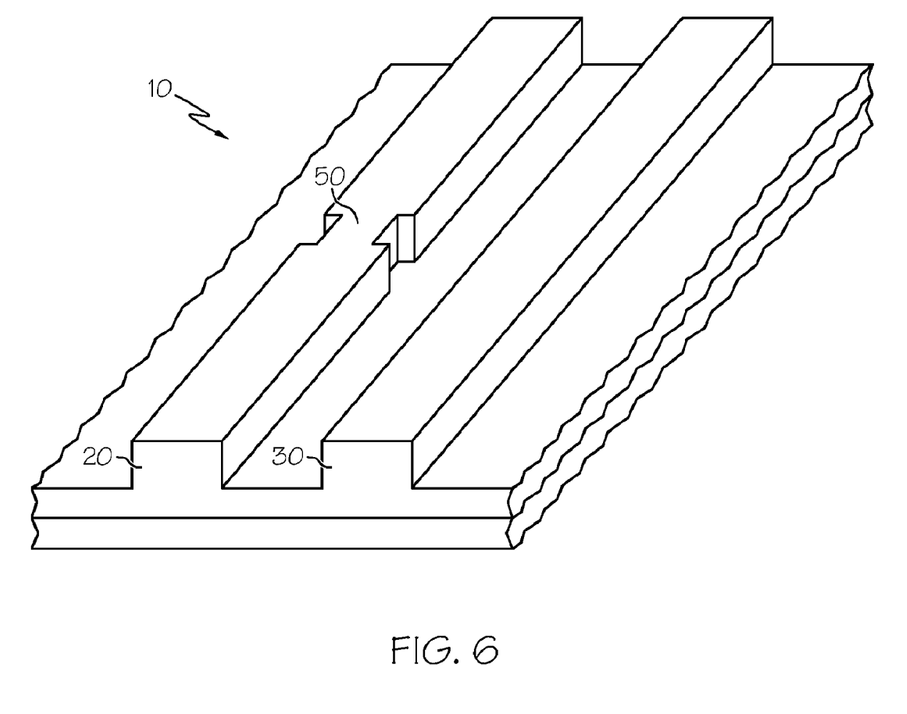
FIG. 6 shows an embodiment of an optical coupler according to the schematic of FIG. 3.

FIG. 6 shows an embodiment of an optical coupler 10 having a phase shift section 50 provided in the first waveguide 20. The embodiment shown in FIG. 6 is similar to the schematic depicted in FIG. 3. The waveguides 20, 30 are shown as ridge waveguides. The phase shift section 50 of waveguide 20 is defined by reducing a width of the ridge of the waveguide 20.

Figure 7:
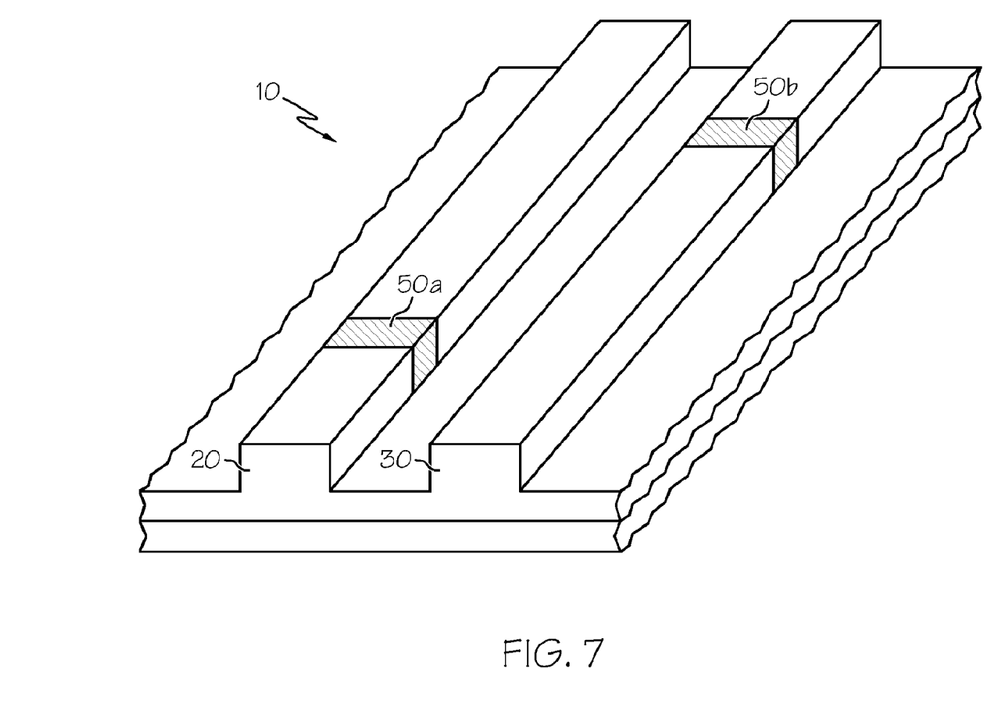
FIG. 7 shows an embodiment of an optical coupler according to the schematic of FIG. 4.

FIG. 7 shows an embodiment of an optical coupler 10 having a first phase shift section 50a provided in the first waveguide 20 and a second phase shift section 50b provided in the second waveguide 30. The waveguides 20, 30 are shown as ridge waveguides. The phase shifts section 50a, 50b are provided by differentially doping the waveguide ridge in the area of the phase shift sections 50a, 50b.

When multiple phase shift sections 50 are provided in an optical coupler, the phase shift section can be similar to one another or the device can include multiple embodiments of phase shift sections. For example, one phase shift section can be provided by changing a width of a waveguide ridge and another phase shift section can be provided by diffused and/or implanted material.

Figure 8:
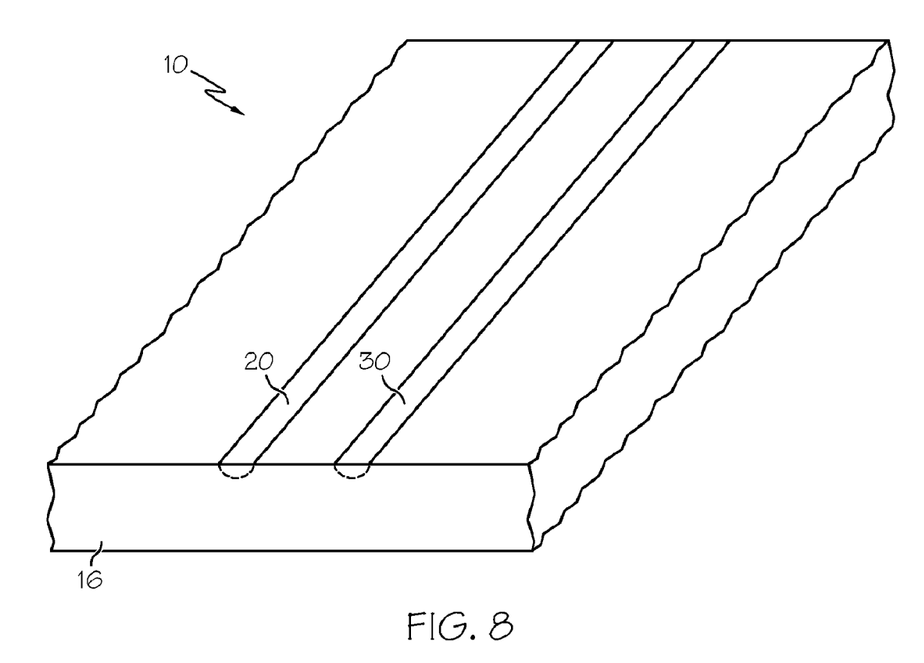
FIGS. 8-10 show further embodiments of an optical coupler.

FIG. 8 shows another embodiment of an optical coupler 10 wherein the substrate 16 comprises the waveguides 20, 30, which can be formed, for example, by diffusion. In some embodiments, the substrate 16 comprises lithium niobate and the waveguides 20, 30 comprise diffused or implanted material, such as titanium.

A method for forming diffused waveguides is disclosed in U.S. Pat. No. 5,749,132, the entire disclosure of which is hereby incorporated herein by reference. A method for forming implanted material waveguides is disclosed in U.S. Pat. No. 4,840,816, the entire disclosure of which is hereby incorporated herein by reference.

Figure 9:
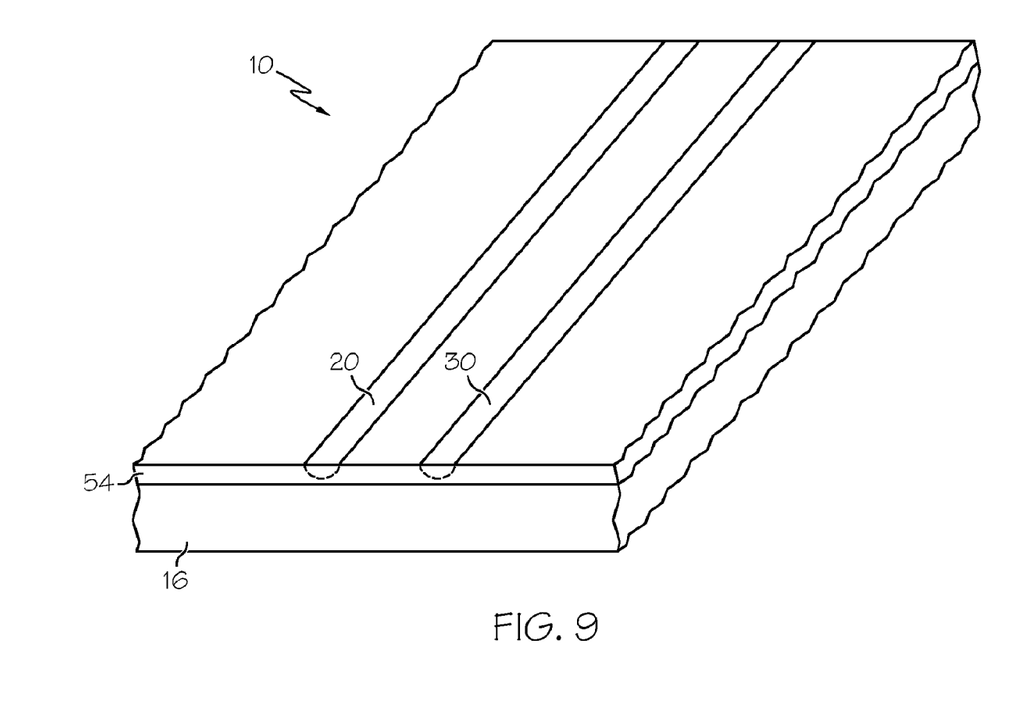

FIG. 9 shows another embodiment of an optical coupler 10 wherein the waveguides 20, 30 are formed in a thin electro-optic film 54. In some embodiments, the substrate 16 can be quartz.

Figure 10:
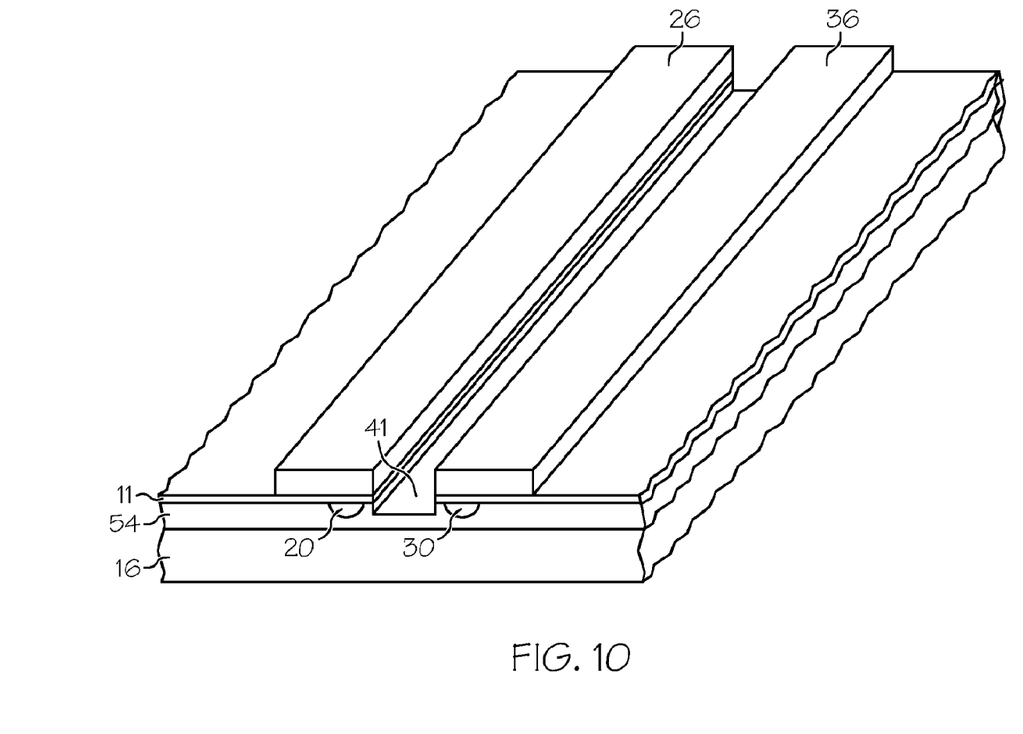

FIG. 10 shows another embodiment of an optical coupler 10 wherein the waveguides 20, 30 are formed by diffusion in a thin lithium niobate film 54 and the trench 41 between waveguide 20, 30 has a constant height. In some embodiments, the substrate 16 can be quartz and buffer layer 11 can be silicon dioxide. The coplanar strip electrodes 26, 36 are formed on the silicon dioxide buffer layer. Because the electrical phase velocity in lithium niobate coplanar strip electrode structure is slower than the optical phase velocity, a fast electrode structure may be used for velocity-matching. The thin film 54 and the trench 41 may be used to increase the microwave velocity.

The optical couplers described in this disclosure have a number of applications in optical networks, including optical modulation. For example, an optical carrier signal can be applied to coupler 10 of FIG. 1 via optical fiber 32 and a radiofrequency (RF) modulating signal can be applied along with a DC bias voltage to one of the coupler's electrodes, e.g., electrode 26 of FIG. 2. Via the coupling provided by coupler 10, the RF modulating signal modulates the optical carrier signal, producing a modulated optical signal on one of the output optical fibers, e.g., optical fiber 24.

The above disclosure is intended to be illustrative and not exhaustive. This description will suggest many variations and alternatives to one of ordinary skill in this field of art. All these alternatives and variations are intended to be included within the scope of the claims where the term "comprising" means "including, but not limited to." Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. An optical coupler comprising:
a substrate;
a first optical waveguide positioned on the substrate;
a second optical waveguide positioned on the substrate, the second optical waveguide extending adjacent to and parallel with the first optical waveguide for at least one effective coupling length, the at least one length having a first end and a second end, the second optical waveguide coupled with the first optical waveguide such that an optical signal applied only to the first optical waveguide couples to the second optical waveguide between said first end and said second end;
a first phase shift section forming a portion of the first optical waveguide, the first phase shift section located at a first predetermined distance from the first end of the length; and
a second phase shift section forming a portion of the second optical waveguide, the second phase shift section located at a second predetermined distance from the second end of the length,
wherein the first predetermined distance is approximately equal to the second predetermined distance, and
wherein the second optical waveguide does not have a phase shift section forming a portion of the second optical waveguide and located at the first predetermined distance from the first end of the length.

2. The optical coupler of claim 1, wherein the first predetermined distance is in a range of about 5% to about 7% of the length.

3. The optical coupler of claim 1, further comprising:
a third phase shift section forming a portion of the first optical waveguide, the third phase shift section located at a second predetermined distance from the first end of the length; and
a fourth phase shift section forming a portion of the second optical waveguide located at a fourth predetermined distance from the second end of the length.

4. The optical coupler of claim 3, wherein the first predetermined distance is in a range of about 5% to about 7% of the length and the second predetermined distance is in a range of about 18% to about 20% of the length.

5. The optical coupler of claim 4, wherein the first predetermined distance from the first end of the length is equal to the third predetermined distance from the second end of the length.

6. The optical coupler of claim 5, wherein the second predetermined distance from the first end of the length is equal to the fourth predetermined distance from the second end of the coupling length.

7. The optical coupler of claim 1, wherein the first optical waveguide comprises a ridge waveguide.

8. The optical coupler of claim 7, wherein at least one of the first phase shift section and the second phase shift section is defined by a change in a width of a ridge of the ridge waveguide for a specified length.

9. The optical coupler of claim 7, wherein at least one of the first phase shift section and the second phase shift section comprises at least one of a diffused material and an implanted material for a specified length.

10. The optical coupler of claim 9, wherein the diffused material comprises lithium niobate.

11. An optical coupler comprising:
a substrate;
a first optical waveguide positioned on the substrate;
a second optical waveguide positioned on the substrate, the second optical waveguide arranged to couple with the first optical waveguide, the second optical waveguide extending adjacent to and parallel with the first optical waveguide for at least one coupling length, the at least one coupling length having a first end and a second end;
a phase shift section forming a portion of the first optical waveguide, the phase shift section located midway between the first end of the length and the second end of the length; and
an electrode arranged to adjust a refractive index of said first optical waveguide independently from said phase shift section;
wherein the second optical waveguide does not have any phase shift sections.

12. The optical coupler of claim 11, wherein the first optical waveguide comprises a ridge waveguide.

13. The optical coupler of claim 12, wherein the phase shift section is defined by a change in a width of a ridge of the ridge waveguide for a specified length.

14. The optical coupler of claim 11, wherein the phase shift section comprises at least one of a diffused material and an implanted material for a specified length.

15. An optical coupler comprising:
a first optical waveguide;
a second optical waveguide configured to couple with the first optical waveguide such that an optical signal applied only to the first optical waveguide couples to the second optical waveguide, said second optical waveguide coupled to said first optical waveguide for at least one effective coupling length, the at least one length having a first end and a second end; and
an even number of phase shift sections, wherein the phase shift sections are located in two or more non-propagation sections of the first optical waveguide and the second optical waveguide.

16. The coupler of claim 15, wherein the even number of phase shift sections are evenly divided between the two or more non-propagation sections.

17. The coupler of claim 15, wherein the first optical waveguide is coupled to a first optical input and the second optical waveguide is coupled to a second optical input.

18. The optical coupler of claim 1, wherein the first optical waveguide is coupled to a first optical input and the second optical waveguide is coupled to a second optical input.

\* \* \* \* \*